US005725953A

United States Patent [19]

Onishi et al.

[11] Patent Number: 5,725,953

[45] Date of Patent: Mar. 10, 1998

[54] HEAT-PROOF ELECTRIC WIRE HAVING A BENZIMIDAZOLE-BASED POLYMER COATING

[75] Inventors: Yasuhiko Onishi; Takashi Itoh; Yoshihiro Tamura, all of Yokkaichi, Japan

[73] Assignee: Sumitomo Wiring Systems, Ltd., Japan

[21] Appl. No.: 650,064

[22] Filed: May 17, 1996

[30] Foreign Application Priority Data

May 18, 1995 [JP] Japan .................................... 7-119905

[51] Int. Cl.$^6$ .............................. D02G 3/00; H01B 7/00; B32B 27/00

[52] U.S. Cl. .......................... 428/383; 428/375; 428/379; 174/110 FC; 174/110 SR

[58] Field of Search .................................... 428/421, 422, 428/379, 383, 375; 174/110 FC, 110 SR

[56] References Cited

U.S. PATENT DOCUMENTS 3,708,439 1/1973 Sayigh et al. .
4,273,829 6/1981 Perreault .................................... 428/421
4,973,629 11/1990 Williams et al. .
5,017,681 5/1991 Wadhwa et al. .

*Primary Examiner*—Newton Edwards
*Attorney, Agent, or Firm*—Jordan B. Bierman; Bierman, Muserlian and Lucas

[57] ABSTRACT

An insulating material comprised of a benzimidazole-based polymer layer and a fluorine-containing rubber layer. This material is heat-resistant and is especially useful for use in electric wires. To manufacture such wires, a varnish solution is prepared by dissolving partially polymerized benzimidazole-based polymers in a solvent, then adding a polymerization initiator thereto. Subsequently, an electric wire is soaked in the solution and heated to cross-link the benzimidazole-based polymers. By repeating this procedure, the electric wire is coated with any desired thickness of a benzimidazole-based polymer layer. This coated wire is further coated with a fluorine-containing rubber layer to obtain a heat-resistant electric wire that is also resistant to dielectric breakdown.

7 Claims, 3 Drawing Sheets

HEAT-PROOF ELECTRIC WIRE HAVING A BENZIMIDAZOLE-BASED POLYMER COATING

The present invention relates to a heat-proof insulating material, and a heat-proof electric wire coated therewith. The invention relates also to a method for preparing such insulating material and electric wire. The method according to the invention has particular application to enameled electric wire having a high heat resistance.

BACKGROUND OF THE INVENTION

There already exist heat-proof electric wires such as polyamide coated wire, enameled wires, and highly heat-proof cementing enameled wires. However, the maximum temperatures of use for these wires are 250° C., 150° C. to 220° C., and 220° C., respectively, the temperature limit being therefore 250° C. at most.

Research is currently being carried out into a heat-proof electric wire having a higher heat resistance, i.e. an electric wire resistant to temperatures above 250° C. The present inventors have already developed an electric wire coated with a film of benzimidazole-based polymer (PBI) and filed Japanese patent application 4/124,342. In this disclosure, a polymer PBI having high heat resistance was applied to a non-coated electric wire or an electric wire coated with an insulating layer, the polymer was then baked to form the benzimidazole-based polymer film or layer.

Such a PBI-coated electric wire has a high heat resistance, i.e. a softening temperature above 350° C. However, at high temperatures, it may be partially oxidized by air, so that, depending on the conditions of use, such a coated wire could not make full use of its advantageous features with respect to heat resistance, voltage resistance, flexibility, and the like.

SUMMARY OF THE INVENTION

It is therefore an object of the present invention to improve the above-mentioned benzimidazole-based coated electric wire or the like, to obtain a heat-proof electric wire or insulating material which displays fully the advantageous characteristics of especially high heat resistance. It is another object of the invention to provide methods for the use of such electric wires or insulating materials, as well as a manufacturing process therefor.

To this end, the invention provides a heat-proof insulating material comprising:

(1) a first layer comprised of benzimidazole-based polymer (a polymer based on at least one benzimidazole monomer), the layer having a first surface facing and in contact with an element including at least one electrically conductive part, and a second surface facing away from said first surface, and (2) a second layer comprised of a fluorine-containing polymer (a polymer derived from a fluorine-containing monomer), the second layer being securely adhered to the second face of the first layer.

The first layer comprises a product of the crosslinking of a plurality of benzimidazole-based polymers of Formula I (I):

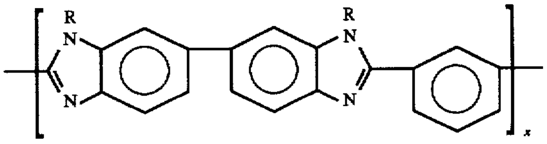

(I)

wherein R is hydrogen or alkyl having 1 to 4 carbon atoms and x is an integer equal to at least 5, may be the same or different for each of the plurality of polymers, and is chosen to yield solvent-soluble polymers. The maximum value of x is about 3,500.

The fluorine-containing polymer comprises a product of the polymerization of at least one of the monomer groups a, b and c represented by Formula II.

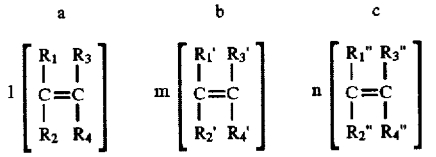

(II)

wherein l, m, and n indicate, respectively, the total number of monomers constituting each of a, b or c, and individually range from 20 to 200,000. At least one member, chosen from the class consisting of $R_1$ to $R_4$, $R_1'$ to $R_4'$, and $R_1''$ to $R_4''$ which is included in at least one of the monomer groups selected, is a fluorine atom. The other members of said class are taken from the group consisting of hydrogen, fluorine, chlorine, substituted or un-substituted methyl, and $O—R_5$, where $R_5$ is hydrogen, alkyl having 1 to 12 carbon atoms, cyclohexyl, cyclohexyl substituted by lower alkyl groups having 1 to 4 carbon atoms, hydroxyalkyl having 1 to 8 carbon atoms, aminoalkyl having 1 to 8 carbon atoms, dialkylaminoalkyl having 1 to 8 carbon atoms, glycidyl, tetrahydrofuran, tetrahydrofuran substituted by lower alkyl groups having 1 to 4 carbon atoms, benzyl, $(—CH_2CH_2O)_tCH_2CH_2OH$ where t is a positive integer between 1 and 10, and $R_6—N—R_7$ where each of $R_6$ and $R_7$ is either hydrogen or alkyl having 1 to 4 carbon atoms.

The heat-resistant insulating material according to the invention may contain simultaneously a first layer comprised of the product of the cross-linking of the benzimidazole-based polymer of Formula I and a second layer comprised of the fluorine-containing polymer which is the product of polymerizing at least one of the monomer groups of Formula II. The element containing at least one electrically conductive part is advantageously an electric wire or an electric wire coated with an insulating layer.

The invention also includes a heat-proof electric wire comprising:

(1) a wire portion containing at least one electrically conductive core;

(2) a first layer comprising the benzimidazole-based polymer, said layer circumferentially coating the wire portion; and (3) a second layer comprising the fluorine-containing rubber, the second layer circumferentially coating the first layer, the wire portion affixed to the first layer, and the first layer affixed to the second layer.

In this heat-proof electric wire, the first layer can be obtained by crosslinking the benzimidazole-based polymers of Formula I. Independently of the composition of the first layer, the fluorine-containing polymer of the second layer can be a product of the polymerization of at least one of the monomer groups of Formula II. However, the heat-resistant electric wire more desirably can combine the first layer containing the cross-linked product of the polymers of Formula I with The second layer containing a polymer of at least one of the monomer groups of Formula II.

Further, the present invention provides a method for manufacturing the aforementioned heat-proof insulating material comprising:

(1) dissolving partially polymerized benzimidazole-based polymers in a basic solvent, thereby forming a varnish solution thereof;

(2) adding a (preferably radical) polymerization initiating agent to this solution, to form a mixture;

(3) extruding the mixture into a shape corresponding to the surface of the element to be confronted;

(4) heating the shape, whereby the benzimidazole-based polymers are heat cross-linked to form a first layer having a first face facing and in contact with the element which includes at least one electrically conductive part, and a second face;

(5) repeating, where appropriate, steps (1) to (4) thereby reinforcing the first layer; and (6) coating the external face of the first layer with a second layer comprised of a fluorine-containing polymer to secure said second layer to the external surface of the first layer.

There is also provided a method for manufacturing a heat-proof wire comprising a wire portion containing at least one electrically conductive part; a first layer comprised of benzimidazole-based polymer, the layer circumferentially coating the wire portion; and a second layer comprised of a fluorine-containing polymer, the second layer circumferentially coating the first layer. The method comprises:

(1) dissolving partially polymerized benzimidazole-based polymers in a basic solvent, thereby obtaining a varnish solution thereof;

(2) adding (preferably radical) polymerization initiating agent to this solution to form a mixture, (3) applying the mixture to the outer circumferential surface of the wire portion;

(4) heating the applied mixture, whereby the benzimidazole-based polymers are heat cross-linked to form a first layer securely on the wire portion;

(5) repeating, where appropriate, steps (1) to (4) thereby reinforcing the first layer; and (6) coating the first layer with a second layer comprised of a fluorine-containing polymer to form the second layer securely on the first layer.

Preferably, the coating mentioned in step (6) is applied by extrusion. Further, during the extrusion, the second layer may be pressed onto the first layer from the exterior through pressurized gas, thereby obtaining better adhesion between the two layers. The heat-proof electric wire thus manufactured may be used in aircraft, high voltage cables, communication cables, electrical heaters, and the like.

BRIEF DESCRIPTION OF THE FIGURES

In the accompanying drawings, constituting a part hereof, and in which like reference characters indicate like parts.

FIG. 5 is a view similar to that of FIG. 2 showing a plurality of first layers.

DETAILED DESCRIPTION OF THE PREFERRED EMBODIMENTS

Figure 1:
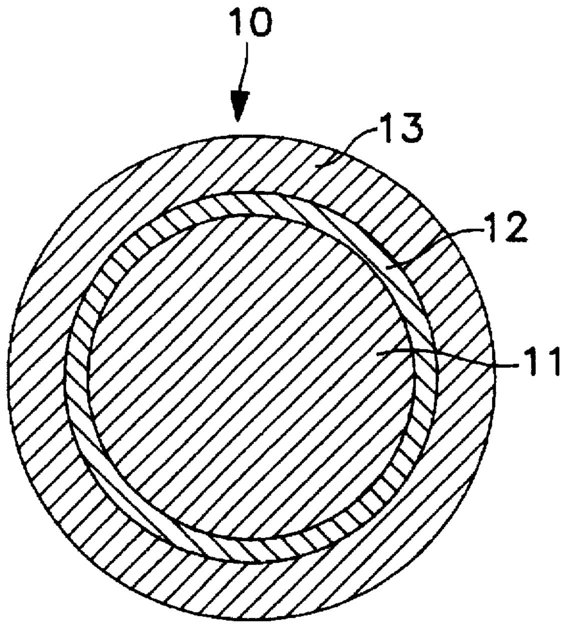
FIG. 1 is a transverse cross-section of a heat-proof electric wire according to the invention, manufactured from a non-coated conductor.

FIG. 1 shows a heat-proof electric wire 10 wherein non-coated conductor 11 is covered with layer 12 composed of PBI (benzimidazole-based polymer). Further, PBI layer 12 is in turn covered with coating 13 composed of a fluorine-containing polymer. PBI layer 12 confers high heat resistance, while coating 13 enables PBI layer 12 to maintain this feature by preventing it from contacting air and avoiding subsequent air oxidation. The thus configured heat-proof electric wire 10 is useful for aircraft, high voltage applications, communication, and electrical heaters which require high heat resistance.

Heat-proof electric wire 10 is prepared by partially polymerizing PBI compounds dissolved in a solvent having a basic pH, thereby producing a PBI varnish. During the varnish preparation, radical-polymerization initiating agents are added. The solvents for varnish preparation include dimethylacetamide (DMA), dimethylformamide (DMF), pyridine, etc., or hydrogen-bonding shielding solvents such as dimethylsulfoxide (DMSO) and the like. The PBI concentration in the varnish solution may vary from 1% to 80%, but is preferably from 5% to 40%. The radical-polymerization initiating agents include benzoyl peroxide, lauroyl peroxide, di-t-butylphthalate peroxide, azo-bis-isobutylnitrile (AIBN), phenylazoalkylsulfonic acid, N-nitroso-N-acyl compounds, and the like. The radical-polymerization initiator is added to the PBI varnish to neutralize polymerization-inhibiting agents present in DMA etc. and the like which are to be used as varnish solvents. This addition promotes the cross-linking reaction of PBI, occurring during the heat treatment, to form a sufficiently strong PBI film.

To cross-link the PBI layer, it is necessary to heat the layer to a temperature above 410° C. However, in this temperature range, cross-linking and an oxidative decomposition occur concurrently, so that delicate PBI-molecular adherence is required. Usually, in the low molecular weight region, the adherence between PBI molecules seems to be insufficient, so that it is sometimes very difficult to strengthen the layer by a mere heating. To solve this problem, it is very effective to add a polymerization initiator such as AIBN. Infrared (IR) analysis suggests that the initiator AIBN, not only neutralizes inhibitors in the solvents, but also reinforces the molecular adhesion, thereby contributing to PBI cross-linking. The PBI varnish, with the added polymerization initiator, is applied to the surface of the non-coated electric wire and adhered thereto by heat treatment. Repetition of the varnish application and heat treatment is usually required.

Figure 3:
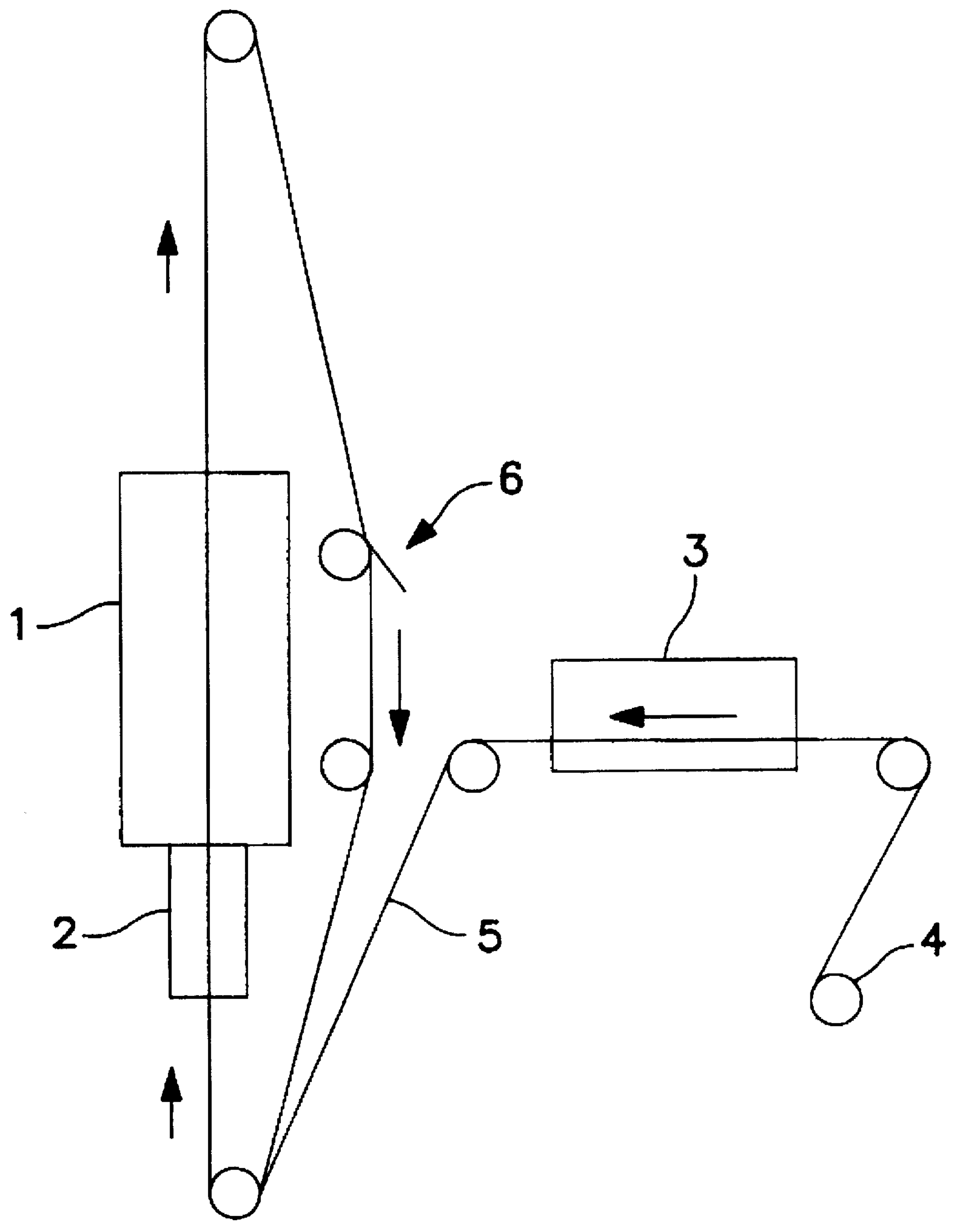
FIG. 3 is a schematic view of a process for applying the benzimidazole-based polymer coating.

FIG. 3 shows a practical known device consisting of furnace 1, application 2, continuous annealing furnace 3, and coiling unit 4. In this device, wire 5 such as an electric conductor, a coated electric wire, etc., wound on coiling unit 4, is uncoiled therefrom, annealed in annealing furnace 3, sent to applicator 2, where the varnish is applied, and then sent to furnace 1 where the varnish is adhered to the wire by heat.

Further, wire 5 may be processed repeatedly through applicator 2 and furnace 1, thereby receiving additional applications of the varnish. The wire coated with the PBI film is then recovered from delivering unit 6.

There are no particular limitations on the kind and diameter of conductors or non-coated wire, or on the thickness of the coating. In accordance with typical handling processes, when non-coated electric wire 11 has a diameter less than 0.6 mm, the applicator may be a horizontal furnace while, when the diameter is larger than 0.6 mm, a vertical furnace is preferred.

This principle may be applied for the PBI coating and heat treatment of the present invention by choosing the type of furnace depending on the circumstances. One may also appropriately modify the application frequency, the heating temperature, the application speed, etc. according to the type of paint or varnish to be treated, the type of furnace, etc. The number of repetitions of coating may vary from one to several hundred but more appropriately from two to 20. The temperature is advantageously between room temperature and 1000° C., preferably between 500° C. and 800° C.

As has been seen, the electric wire is covered with PBI film 12. Then, the outer surface of the film is further covered with the fluorine-containing polymer, thereby forming another coating 13. Such fluorine-containing polymer is comprised of a polymer obtained from the monomer groups having the Formula II which may be, for example, polytetrafluoroethylene (PTFE); a copolymer of tetrafluoroethylene and hexafluoropropylene (FEP); a copolymer of tetrafluoroethylene and perfluoroalkylvinylether (PFA); a copolymer of tetrafluoroethylene, hexafluoropropylene, and perfluoroalkylvinylether (EPE); a copolymer of ethylene and tetrafluoroethylene (ETFE); polychlorotrifluoroethylene (PCTFE); a copolymer of ethylene and chlorotrifluoroethylene (ECTFE); polyvinylidene fluoride (PVDF); or polyvinyl fluoride (PVF).

Figure 4:
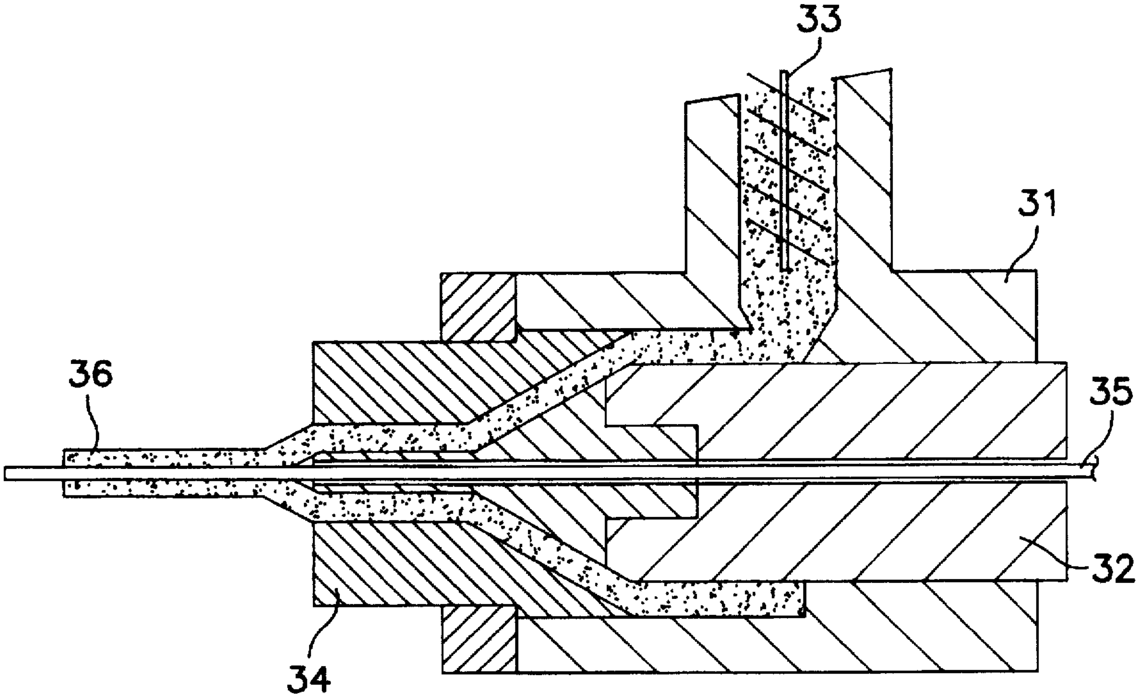
FIG. 4 shows the process for applying the fluorine-containing polymer coating.

Processes for preparing such fluorine-containing polymer coatings include Physical Vapor Deposition (PVD), Chemical Vapor Deposition (CVD), extrusion, etc. The extrusion device typically will comprise barrel 31, cylinder 32, fluorine rubber feeder 33, and die 34, as shown in FIG. 4. PBI-coated wire 35 is fed into the device from one side and fluorine polymer coated PBI wire 36 exits from the other side. At the exit zone, the fluorine polymer is immediately reduced in cross-sectional area by the traction exerted on the exiting wire. Immediately afterwards, the fluorine polymer coated PBI wire is stretched at a constant speed.

Conditions for the extrusion may vary according to fluorine-containing polymer materials. In particular, the polymer PTFE requires difficult extrusion conditions, due to its high glass transition point of 327° C. and high molten viscosity of about $10^{11}$ poises. In this case, as in the case of paste extrusion, the polymer PTFE and oil were emulsion-polymerized to form adhesive particles, which were dried and used.

The extrusion process consists of three essential steps, preliminary forming, heating, and cooling. The preliminary forming is effected at a pressure of about 7 to 10 $kg/cm^2$. When additives are added to facilitate the extrusion, they are distilled off at 100° to 300° C. The product thus obtained is baked at a temperature above 327° C. and cooled to obtain the final product.

Commercially available copolymer FEP melts at 288° C. and has a molten viscosity of 6 to $8\times10^4$ poises at 380° C. Characteristically, a tube of copolymer FEP with an appropriate thickness is extruded, drawn to reduce the thickness while covering the PBI-coated wire, then stretched to obtain a final product having the desired FEP coating thickness. Wires having a diameter of about 3 mm are preferably drawn to obtain a reduction of cross section area of about 100:1. Where the wire has a diameter of less than 3 mm and a coating thickness less than 0.75 mm, compressed air or nitrogen gas is preferably passed over the fluorine polymer coating, thereby pressing the latter onto the PBI layer. The extrusion temperature is advantageously maintained at a low temperature of 320° C. to 345° C. The reduction ratio by drawing and stretching is preferably between 3:1 and 30:1. The product after drawing is rapidly cooled.

To form wire coatings of copolymer PFA, the copolymer is usefully maintained at 380° to 410° C., then drawn in a reduction ratio of 60:1 to 150:1, preferably about 100:1. Copolymer ETFE can be extruded at 320° to 350° C., then drawn and stretched in a reduction ratio of 20:1 to 100:1, preferably about 60:1. In the case of polymer PVDF, the extrusion temperature is desirably from 200° C. to 280° C. and the reduction ratio is preferably from 10:1 to 100:1, more preferably about 30:1. In the case of copolymer ECTFE, the extrusion temperature is advantageously from 250° to 300° C. and the reduction ratio is maintained at 10:1 to 100:1, preferably about 60:1. As for the polymer PCTFE, molding powder or pellets may be used to form wire coatings at an extrusion temperature of about 300° to 350° C. Copolymer EPE is usually extruded at a temperature between 360° and 400° C., with a reduction ratio of 20:1 to 100:1, preferably about 100:1. In the case of polymer PVF, its melting temperature is low at 200° C. but very near the decomposition temperature. It may therefore be mixed with a solvent capable of dissolving it at high temperatures. Examples are 2-pyrrolidone, 2-piperidone, β-propiolactone, etc; the mixture may then be coated on the wire by a wet or dry coating method.

With the exception of polymer PVF, the extrusion rate (line speed) varies from about 1 m/min to 1000 m/min, but preferably is between 10 m/min and 200 m/min. Polymer PVF apart, extrusion can be effected at a temperature above the melting point of the fluorine-containing polymer. It is frequently between 200° and 350° C.

Particular examples based on the present invention are described hereinafter. Unless otherwise stated, all parts are by weight.

EXAMPLE 1

A nickel-chromium wire having a diameter of 0.5 mm was soaked in a varnish solution consisting of 30 parts of PBI and 70 parts of solvent DMA, whereby the varnish was applied to the wire. The varnish was adhered thereto by heating at a line speed of 20 m/min at 350° C. The above procedure was repeated 8 times to obtain a PBI film-coated, nickel-chromium wire.

Copolymer FEP was extruded around—and caused to adhere to—the PBI film-coated wire under the following conditions: drawing reduction ratio 16.3%; drawing balance 1.0 (speed balance between outer and inner tuber surfaces when coating a wire by tubing extrusion); extrusion rate 10 m/min; cylinder temperature 260° to 320° C.; and then was cooled, whereby a PBI film-coated nickel-chromium wire, further covered with FEP coating was obtained.

EXAMPLE 2

A nickel-chromium wire having a diameter of 0.5 mm was soaked in varnish solution consisting of 30 parts of PBI and 70 parts of solvent DMA, whereby the varnish was applied to the wire. The varnish was adhered thereto by heating at a line speed of 20 m/min at 350° C. The above procedure was repeated 8 times, to obtain a PBI film-coated nickel-chromium wire.

Copolymer PFA was extruded around—and caused to adhere to—the PBI film-coated wire under the following conditions: drawing reduction ratio 70%; drawing balance 1.0; extrusion rate 10 m/min; cylinder temperature 380° to 410° C.; and was thereafter cooled, whereby a PBI film-coated nickel-chromium wire, further covered with PFA coating, was obtained.

EXAMPLE 3

A copper wire having a diameter of 0.5 mm was soaked in varnish solution consisting of 30 parts of PBI and 70 parts of solvent DMA, the varnish solution further comprising 0.1% (g/ml) of AIBN initiator, whereby the varnish was applied to the wire. The varnish was adhered thereto by baking at a line speed of 50 m/min at 600° C. The above procedure was repeated 8 times, to obtain a PBI film-coated copper wire.

Forming of PTFE polymer coating by extrusion was effected through 3 main steps consisting of preliminary forming, heating, and cooling. The polymer PTFE was emulsion polymerized in oil to form adhesive particles to be used for paste extrusion and dried. The particles thus obtained were extruded onto the coated wire at a rate of 10 m/min and the extrusion additives were distilled off at 200° C. Then the coated particles were heated to about 327° C. and cooled to obtain a PBI film-coated copper wire, further covered with PTFE coating.

EXAMPLE 4

A nickel-plated copper wire having an external diameter of 0.5 mm was soaked in varnish solution consisting of 30 parts of PBI molecules and 70 parts of solvent DMA, the varnish solution further comprising 0.1% (g/ml) of AIBN initiator, whereby the varnish was applied to the wire. The varnish was adhered thereto by heating at a line speed of 50 m/min at 600° C. The above procedure was repeated 8 times to obtain a nickel-plated copper wire covered with a PBI film.

Polymer PTFE was extruded around—and caused to adhere to—the PBI film-coated wire at a rate of 10 m/min, and extrusion additives were distilled off at 200° C. Then, the polymer was heated to above 327° C. and cooled to obtain a nickel plated copper wire covered with a PBI film, further covered with PTFE coating.

EXAMPLE 5

A nickel-plated copper wire having an external diameter of 0.5 mm was soaked in varnish solution consisting of 30 parts of PBI, 60 parts of DMA solvent, and 10 parts of solvent DMSO, the varnish solution further comprising 0.1% (g/ml) of AIBN initiator, whereby the varnish was applied to the wire. Then, the varnish was adhered thereto by heating at a line speed of 20 m/min at 600° C. The above procedure was repeated 8 times to obtain a nickel-plated copper wire covered with a PBI film.

Copolymer PFA was extruded around—and caused to adhere to—the PBI film-coated wire at a rate of 20 m/min at 400° C. to obtain a nickel-plated copper wire covered with a PBI film, further covered with PFA coating.

EXAMPLE 6

An oxygen-free copper wire having a diameter of 0.36 mm was soaked in varnish solution consisting of 20 parts of PBI and 80 parts of solvent DMA, whereby the varnish was applied to the wire. The varnish was adhered thereto by heating at a line speed of 10 m/min at 500° C. The above procedure was repeated 10 times to obtain a PBI-coated oxygen-free copper wire.

Copolymer ETFE was extruded around—and caused to adhere to— the PBI-coated wire at a rate of 15 m/min at 330° C. to obtain a PBI-coated oxygen-free copper wire, further covered with ETFE coating.

EXAMPLE 7

A nickel-plated copper wire having an external diameter of 1.5 mm was soaked in varnish solution consisting of 55 parts of PBI and 45 parts of solvent DMA, whereby the varnish was applied to the wire. The varnish was adhered thereto by heating at a line speed of 60 m/min at 700° C. The above procedure was repeated 20 times to obtain a PBI-coated nickel-plated copper wire.

Copolymer PFA was extruded around—and caused to adhere to—the PBI-coated wire at a rate of 30 m/min at 410° C., to obtain a nickel-plated copper wire covered with a PBI film, further with PFA coating.

EXAMPLE 8

A nickel-plated copper wire having an external diameter 2.5 mm was soaked in a varnish solution consisting of 65 parts of PBI and 35 parts of solvent DMA, whereby the varnish was applied to the wire. Then, the varnish was adhered thereto by heating at a line speed of 30 m/min at 600° C. The above procedure was repeated 15 times to obtain a PBI-coated nickel-plated copper wire.

Copolymer ETFE was then extruded around—and caused to adhere to—the PBI-coated wire at a rate of 30 m/min at 340° C. to obtain a nickel-plated copper wire covered with a PBI film, further covered with ETFE coating.

EXAMPLE 9

A nickel-copper alloy wire having a diameter of 1.5 mm was soaked in a varnish solution consisting of 55 parts of PBI and 45 parts of DMA solvent, whereby the varnish was applied to the wire. Then, the varnish was adhered thereto by heating at a line speed of 30 m/min at 500° C. The above procedure was repeated 20 times to obtain a PBI-coated alloy wire.

Copolymer ECTFE was extruded around—and caused to adhere to—the PBI-coated wire at a rate of 30 m/min at 280° C. and with a reduction ratio of 60:1, whereby a nickel-copper alloy wire covered with a PBI film, further covered with ECTFE coating was obtained.

EXAMPLE 10

A nickel-chromium alloy wire having a diameter of 0.36 mm was soaked in a varnish solution consisting of 20 parts of PBI and 80 parts of DMA solvent, whereby the varnish was applied to the wire. Then, the varnish was adhered thereto by heating at a line speed of 10 m/min at 500° C. The above procedure was repeated 10 times to obtain a PBI-coated alloy wire.

Then, copolymer PFA was extruded around—and caused to adhere to—the PBI-coated wire at a rate of 22 m/min at 405° C. to obtain a nickel-chromium alloy wire covered with a PBI film and further covered with PFA coating.

EXAMPLE 11

An oxygen-free copper wire having a diameter of 0.36 mm was soaked in a varnish solution consisting of 20 parts of PBI and 80 parts of DMA solvent, whereby the varnish was applied to the wire. Then, the varnish was adhered thereto by heating at a line speed of 10 m/min at 500° C. The above procedure was repeated 10 times to obtain a PBI-coated oxygen-free wire.

Then, copolymer EPE was extruded around—and caused to adhere to—the PBI-coated wire at a rate of 30 m/min at 360° C. and with a drawing reduction ratio of 100:1, whereby an oxygen-free copper wire covered with a PBI film, further covered with EPE coating was obtained.

Table 1 shows general features of the samples obtained by the foregoing examples. As can be seen therefrom, all the samples prepared according to the invention show a high heat resistance and a high resistance to dielectric breakdown. As regards the nickel-chromium wire illustrated in Example 1, ageing testing was effected on PBI and FEP coated wire, as well as wire coated solely with PBI film, at 300° C. for 24 hours under atmospheric air.

Table 2 shows a comparison of the nickel-chromium wire covered only with the PBI film and also coated with both PBI and FEP. The dielectric breakdown value (kV) in the single coated wire deteriorated from its initial value of 2.1 to 1.9. In the case of the PBI and FEP coated nickel-chromium wire, the FEP coating deteriorated; however, when the FEP coating was stripped off, the underlying PBI film showed that its initial dielectric breakdown of 2.1 kV had been maintained. Identical results were obtained for Examples 2 and 11.

Figure 2:
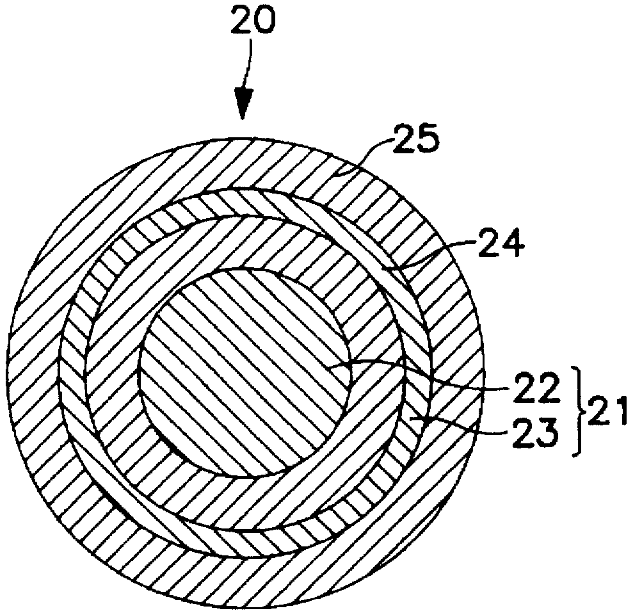
FIG. 2 is a transverse cross-section of a heat-proof electric wire according to the invention, manufactured from a conductor coated with an insulating layer.

The examples mentioned above are concerned with non-coated electric wires 11 covered with a PBI film 12 and further with a fluorine-containing polymer coating 13 provided thereon. However, in a variant heat-proof wire 20 as shown in FIG. 2, the starting wire may be coated wire portion 21 composed of conductive core 22 and insulating coating 23. Wire 21 is covered with PBI film 24 and further with coating 25 of a fluorine-containing polymer.

As to FIG. 5, an element, such as conductor 11, is coated with insulating layer 23. In this embodiment, the first layer comprising PBI consists of inner layer *24b* and outer layer *24a*. Second layer 25 comprises a polymer derived from a fluorine-containing monomer.

Moreover, use of the above-mentioned PBI and fluorine-containing polymer films, layers, or coatings is not limited to heat-proof electric wires. The structure comprised of a first layer of PBI and a second layer of fluorine-containing polymer disposed thereon may be used more generally as a heat-proof insulating material.

With the heat-proof electric wires or heat-proof insulating materials according to the invention, even when they are used under very severe conditions, the PBI film is shielded from direct contact with air, whereby advantageous features of the polymer PBI such as heat resistance are retained intact.

TABLE 1

Dimensions and performance of the samples obtained in Examples 1 to 11

| | Example 1 | Example 2 | Example 3 | Example 4 | Example 5 | Example 6 |
|---|---|---|---|---|---|---|
| PBI-finished wire, outer diameter (mm) | 0.516 | 0.516 | 0.516 | 0.516 | 0.511 | 0.401 |
| PBI film thickness (mm) | 0.008 | 0.008 | 0.008 | 0.008 | 0.0055 | 0.0250 |
| Fluorine polymer finished wire, outer diameter (mm) | 0.756 | 0.956 | 0.756 | 0.756 | 0.771 | 0.701 |
| Fluorine-polymer coating thickness (mm) | 0.120 | 0.220 | 0.120 | 0.120 | 0.130 | 0.150 |
| PBI finished, dielectric breakdown (kV) initial | 2.1 | 2.1 | 2.1 | 2.1 | 2.2 | 3.5 |
| Fluorine-polymer finished, dielectric breakdown (kV), initial* | 10.0 | 12.0 | 10.1 | 10.0 | 13.0 | 14.5 |
| Thermal Shock** | OK | OK | OK | OK | OK | OK |
| Wear (Use Frequencies)*** | 1040 | 1140 | 1030 | 1040 | 940 | 950 |

| | Example 7 | Example 8 | Example 9 | Example 10 | Example 11 |
|---|---|---|---|---|---|
| PBI-finished wire, outer diameter (mm) | 1.518 | 2.520 | 1.519 | 0.402 | 0.403 |
| PBI film thickness (mm) | 0.009 | 0.010 | 0.008 | 0.0210 | 0.0215 |
| Fluorine polymer finished wire, outer diameter (mm) | 1.858 | 2.840 | 1.919 | 0.640 | 0.623 |
| Fluorine-polymer coating thickness (mm) | 0.170 | 0.160 | 0.200 | 0.119 | 0.110 |
| PBI finished wire, dielectric breakdown voltage (kV) | 2.2 | 3.5 | 2.1 | 3.2 | 3.2 |
| Fluorine-polymer finished, dielectric breakdown (kV) initial* | 15.0 | 16.0 | 16.0 | 13.0 | 12.0 |
| Thermal Shock** | OK | OK | OK | OK | OK |
| Wear (Use Frequencies)*** | 945 | 950 | 845 | 930 | 920 |

*AC, V/1 min
**220° C. × 0.5 h after 20% of elongation
***Load 4N (JASO, D611)

TABLE 2

| Ageing test effected on the samples (coated Ni—Cr wire) obtained in Example 1 | | |
|---|---|---|
| Dielectric breakdown (kV) | PBI and FEP coat finishing (measured on the PBI film) | PBI film finishing |
| Before ageing | 2.1 | 2.1 |
| After ageing | 2.1 | 1.9 |

While only a limited number of specific embodiments have been expressly disclosed, the invention is to be broadly construed and not to be limited except by the character of the claims appended hereto.

What we claim is:

1. A heat-resistant insulating material for an element including at least one electrically conductive part, said material consisting essentially of a first layer comprising at least one first polymer based on at least one benzimidazole monomer, said layer having an internal surface, and an external surface facing away from said internal surface; and a second and outermost layer comprising at least one second polymer derived from at least one fluorine-containing monomer, said second layer being adhered to said external face of said first layer.

2. The insulating material of claim 1 wherein said first layer comprises a plurality of polymer layers, including an inner layer and an outer layer, said internal surface being on said inner layer and said external surface being on said outer layer.

3. The insulating material of claim 1 wherein said internal surface is in contact with said element.

4. The insulating material of claim 1 wherein there is an insulating layer between said element and said internal surface.

5. The insulating material of claim 1 wherein said first polymer is according to Formula I (I):

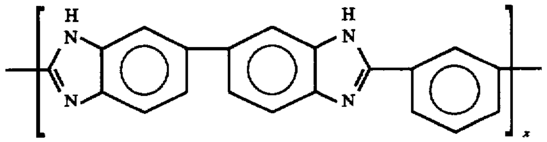

(I)

wherein x is an integer of at least 5 and is selected so that said first polymer is solvent soluble.

6. The insulating material of claim 1 wherein said fluorine-containing monomer is selected from the group consisting of a, b, c, and mixtures thereof a b c (II)

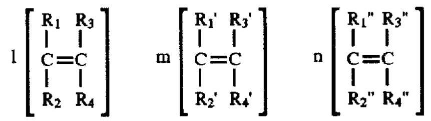

wherein l, m, and n individually indicate a total number of monomers a, b, and c, respectively, in said second polymer, each of l, m, and n bring an integer between 20 and 200,000, $R_1$ to $R_4$, $R_1'$ to $R_4'$, and $R_1''$ to $R_4''$ being individually hydrogen, fluorine, chlorine, substituted or unsubstituted methyl, or O—$R_5$, wherein $R_5$ is hydrogen, alkyl having 1 to 12 carbon atoms, cyclohexyl, cyclohexyl substituted by at least one alkyl having 1 to 4 carbon atoms, hydroxy alkyl having 1 to 8 carbon atoms, aminoalkyl having 1 to 8 carbon atoms, dialkylaminoalkyl having 1 to 8 carbon atoms, glycidyl, tetrahydrofuran, tetrahydrofuran substituted by at least one alkyl having 1 to 4 carbon atoms, benzyl, $(-CH_2CH_2-O-)_tCH_2CH_2OH$ wherein t is an integer between 1 and 10, and $R_6$—N—$R_7$ wherein each of $R_6$ and $R_7$ is hydrogen or alkyl having 1 to 4 carbon atoms, at least one of $R_1$ to $R_4$, $R_1'$ to $R_4'$, and $R_1''$ to $R_4''$ in said second polymer is fluorine.

7. The insulating material of claim 2 wherein said fluorine-containing monomer is selected from the group consisting of a, b, c, and mixtures thereof a b c (II)

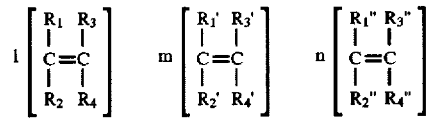

wherein l, m, and n individually indicate a total number of monomers a, b, and c, respectively, in said second polymer, each of l, m, and n bring an integer between 20 and 200,000, $R_1$ to $R_4$, $R_1'$ to $R_4'$, and $R_1''$ to $R_4''$ being individually hydrogen, fluorine, chlorine, substituted or unsubstituted methyl, or O—$R_5$, wherein $R_5$ is hydrogen, alkyl having 1 to 12 carbon atoms, cyclohexyl, cyclohexyl substituted by at least one alkyl having 1 to 4 carbon atoms, hydroxy alkyl having 1 to 8 carbon atoms, aminoalkyl having 1 to 8 carbon atoms, dialkylaminoalkyl having 1 to 8 carbon atoms, glycidyl, tetrahydrofuran, tetrahydrofuran substituted by at least one alkyl having 1 to 4 carbon atoms, benzyl, $(-CH_2CH_2-O-)_tCH_2CH_2OH$ wherein t is an integer between 1 and 10, and $R_6$—N—$R_7$ wherein each of $R_6$ and $R_7$ is hydrogen or alkyl having 1 to 4 carbon atoms, at least one of $R_1$ to $R_4$, to $R_1'$ to $R_4'$, and $R_1''$ to $R_4''$ in said second polymer is fluorine.

* * * * *